(No Model.)

A. G. ALEXANDER.
Water Closet.

No. 234,934. Patented Nov. 30, 1880.

Witnesses:
George H. Carlisle
Geo. B. Remick

Inventor:
A. G. Alexander

UNITED STATES PATENT OFFICE.

ALEXANDER G. ALEXANDER, OF DETROIT, MICHIGAN.

WATER-CLOSET.

SPECIFICATION forming part of Letters Patent No. 234,934, dated November 30, 1880.

Application filed July 29, 1880. (No model.)

*To all whom it may concern:*

Be it known that I, ALEXANDER G. ALEXANDER, of the city of Detroit, in the county of Wayne and State of Michigan, have invented a new and useful Improvement in Water-Closets, of which the following is a specification.

Figure 1:
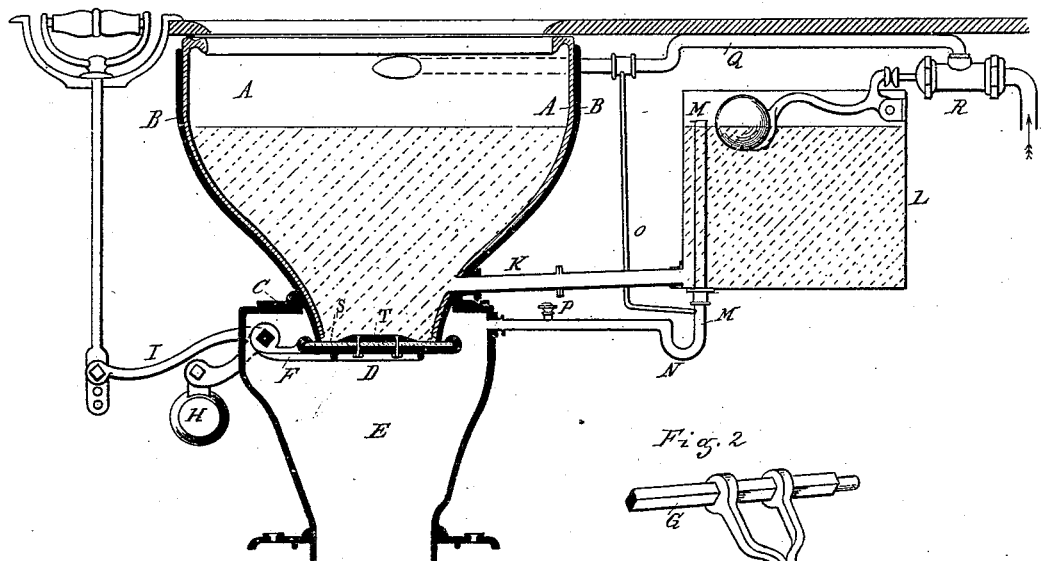
Figure 2:
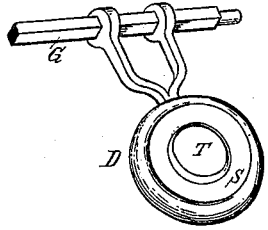

In the drawings, Figure 1 is a sectional view of my invention, and Fig. 2 is an enlarged top view of the valve D.

My invention relates to that class of water-closets in which a valve is held against the neck of the bowl, a lever provided for opening said valve, a water-tank connected with the bowl, and the flow of water from the main service-pipe regulated by a valve which is actuated by a float in the tank.

My improvement consists in the combination, with the water-closet bowl and a trunk fitted to the under portion of the bowl, of a tank connected by a pipe with the bowl, the main service-pipe leading into the bowl, an overflow-pipe formed with a trap and leading from the tank into the trunk, and a small pipe connecting the main service-pipe with the overflow-pipe at a point above the trap in the latter, as more fully hereinafter described.

A is an ordinary tapering porcelain bowl. B is a cast-iron shell or bowl, into which the porcelain bowl A is set and firmly cemented. The inside of the bowl B may be enameled and used without the porcelain bowl A. The bowl B extends below the top of the trunk E, and on it is cast a flange, C, which bolts to the top of the trunk.

E is an ordinary cast-iron trunk connecting with the soil-pipe.

D is a metal disk, the edge of which is curved upward to form a rim.

S is a rubber disk fitting on the upper surface of D, and T is a metallic washer bolted to D and holding the rubber disk S firmly onto the disk D, forming a valve, which I shall hereinafter call D.

The lower end of B is turned smooth and forms a seat for valve D. The lower end of bowl B may be cast in two walls, so as to present a vertical groove all around the lower end. In this groove may be inserted a rubber ring to form a valve-seat, and in that case the valve D may consist of a plain metal disk.

G is a rock-shaft carrying an arm, F, on the outer end of which arm is cast or bolted the valve D. H is a weight attached to rock-shaft G to keep the valve D firmly closed. I is a crank and pull for opening valve D.

L is a small water-tank, made of metal of suitable thickness. K is a pipe which runs from the lower part of tank L into the bowl B, near its bottom, above the valve D.

M is an overflow-pipe for tank L, leading into the trunk E, and having a trap, N.

O is a small pipe leading from the water-inlet pipe near bowl B to the overflow-pipe M between the trap and the tank.

P is a ventilating-pipe for overflow-pipe M, which may be led to any convenient ventilating-flue.

Q is the water-inlet pipe. R is a float or ball valve, of any ordinary form, for opening and closing the water-inlet pipe Q. I prefer to place this valve inside of or over the tank L, but it may be placed outside.

It is very desirable in a water-closet using the ordinary tapering bowl to hold the water in the bowl at all times sufficiently high to prevent the side of the bowl from being soiled, to insure a good supply of water when the discharge-valve is opened, and to insure the filling of the bowl to the desired height when the discharge-valve is closed. This cannot be accomplished in the ordinary pan-closet, but is by my invention.

The construction and operation of my improved closet are as follows:

The tank L is placed at the side of the bowl B, and is connected with the bowl by the pipe K, which should be of much larger diameter than the inlet-pipe Q. As the water in the bowl and tank will stand at the same level, the tank should be so placed that the water-line at which the float-valve R will close will be the line at which it is desired to hold the water in bowl B. The water-inlet pipe Q passes over or through the tank L, and is connected with the bowl A (or bowl B when A is not used) in the usual manner. The pipe Q is connected with the float-valve R.

The valve D being closed and the tank L and bowl B empty, water would enter the bowl B from the inlet-pipe Q and pass into the tank L through the pipe K until the water in the tank rose high enough to close the float-valve R, when the flow through the inlet-pipe would cease. When the valve D is opened the water in the bowl escapes into the trunk E, the water in tank L is discharged into the bowl through pipe K, thoroughly washing the lower part of the bowl and the face of valve D, and the float-valve R opens and admits water through the inlet-pipe Q to bowl B. On closing the valve D the bowl and tank are again filled with water and the flow of water checked, as above explained. At each opening of the float-valve R a small quantity of water passes from the inlet-pipe Q to the overflow-pipe M above the trap N through the small pipe O, thus occasionally changing the water in trap N.

Having thus described my invention, what I claim as new, and desire to secure by Letters Patent, is as follows:

1. The combination, with the water-closet bowl and a trunk, E, of the tank L, connected with the bowl by a pipe, K, the main service-pipe leading into the bowl, an overflow-pipe, M, having a trap, N, and leading from the tank L into the trunk E, substantially as shown and described.

2. The combination, with the water-closet bowl and a trunk, E, of the tank L, connected with the bowl by a pipe, K, the main service-pipe leading into the bowl, an overflow-pipe, M, formed with a trap, N, and leading from the tank into the trunk E, and a small pipe connecting the main service-pipe with the overflow-pipe at a point above the trap in the latter pipe, as herein shown and specified.

A. G. ALEXANDER.

Witnesses:
GEORGE H. CARLISLE,
GEO. B. REMICK.